United States Patent
Pekar

(10) Patent No.: US 12,546,522 B2
(45) Date of Patent: Feb. 10, 2026

(54) COMPRESSOR CONTROL IN A VAPOR COMPRESSION COOLING CYCLE

(71) Applicant: Garrett Transportation I Inc., Torrance, CA (US)

(72) Inventor: Jaroslav Pekar, Pacov (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 238 days.

(21) Appl. No.: 18/391,344

(22) Filed: Dec. 20, 2023

(65) Prior Publication Data

US 2025/0207836 A1 Jun. 26, 2025

(51) Int. Cl.
F25B 49/02 (2006.01)
F25B 31/02 (2006.01)

(52) U.S. Cl.
CPC .......... *F25B 49/025* (2013.01); *F25B 31/026* (2013.01); *F25B 2600/0253* (2013.01); *F25B 2700/1353* (2013.01); *F25B 2700/171* (2013.01); *F25B 2700/1933* (2013.01); *F25B 2700/195* (2013.01); *F25B 2700/197* (2013.01)

(58) Field of Classification Search
CPC ........ F25B 49/00; F25B 49/02; F25B 49/022; F25B 49/025; F25B 2600/025; F25B 2600/0253; F25B 2700/13; F25B 2700/1353

See application file for complete search history.

(56) References Cited

U.S. PATENT DOCUMENTS

| | | | |
|---|---|---|---|
| 2,512,561 | A | 6/1950 | Ziegler |
| 2,959,029 | A | 11/1960 | Best |
| 2,981,077 | A | 4/1961 | Farkas |
| 3,047,210 | A | 7/1962 | Best |
| 3,079,121 | A | 2/1963 | Griffing |
| 3,082,609 | A | 3/1963 | Ryan et al. |
| 3,184,926 | A | 5/1965 | Blake |
| 4,347,711 | A | 9/1982 | Noe et al. |
| 4,358,929 | A | 11/1982 | Molivadas |
| 4,487,034 | A | 12/1984 | Cronin et al. |
| 4,581,903 | A | 4/1986 | Kerry |
| 5,044,167 | A | 9/1991 | Champagne |
| 5,050,389 | A | 9/1991 | Wigmore et al. |
| 5,065,590 | A | 11/1991 | Powell et al. |
| 5,066,197 | A | 11/1991 | Champagne |

(Continued)

FOREIGN PATENT DOCUMENTS

| | | |
|---|---|---|
| EP | 1884726 A2 | 2/2008 |
| EP | 1578664 B1 | 4/2008 |

(Continued)

OTHER PUBLICATIONS

DE 10 2021 214 649 (English translation) (Year: 2021).*

(Continued)

*Primary Examiner* — Jonathan Bradford
(74) *Attorney, Agent, or Firm* — BelayIP

(57) ABSTRACT

Controllers, system and methods for vapor cycle compressor speed management. A system having a compressor, a condenser, an expansion valve and an evaporator with a circulating refrigerant or refrigerant is managed. A compressor controller uses expansion valve position, a mass flow estimate, or a mass flow measurement to determine desired compressor speed.

20 Claims, 9 Drawing Sheets

(56) References Cited

U.S. PATENT DOCUMENTS

| | | |
|---|---|---|
| 5,070,706 A | 12/1991 | Waters et al. |
| 5,088,292 A | 2/1992 | Champagne et al. |
| 5,109,676 A | 5/1992 | Waters et al. |
| 5,174,729 A | 12/1992 | Waters et al. |
| 5,259,210 A | 11/1993 | Ohya et al. |
| 5,278,772 A | 1/1994 | Knupp |
| 5,735,134 A | 4/1998 | Liu et al. |
| 5,771,703 A | 6/1998 | Rajendran |
| 6,318,101 B1 | 11/2001 | Pham et al. |
| 6,321,549 B1 | 11/2001 | Reason et al. |
| 6,843,067 B2 | 1/2005 | Lee et al. |
| 6,854,285 B2 | 2/2005 | Jessen |
| 7,134,291 B2 | 11/2006 | Horan et al. |
| 7,784,296 B2 | 8/2010 | Chen et al. |
| 8,365,550 B2 | 2/2013 | Vogel |
| 8,793,003 B2 * | 7/2014 | Laughman .............. G05B 11/32 700/282 |
| 11,442,437 B2 | 9/2022 | Urich et al. |
| 11,635,091 B2 | 4/2023 | Zug et al. |
| 11,656,612 B2 | 5/2023 | Espie et al. |
| 2004/0093124 A1 | 5/2004 | Havlena |
| 2006/0162358 A1 | 7/2006 | Vanderzee |
| 2007/0113568 A1 | 5/2007 | Jang et al. |
| 2007/0113579 A1 | 5/2007 | Claeys et al. |
| 2008/0023563 A1 | 1/2008 | Tamura |
| 2008/0264084 A1 | 10/2008 | Derouineau et al. |
| 2009/0031740 A1 | 2/2009 | Douglas |
| 2009/0158764 A1 * | 6/2009 | Kim ..................... F25B 49/02 62/225 |
| 2022/0057127 A1 | 2/2022 | Zug et al. |
| 2022/0178602 A1 | 6/2022 | Zug |
| 2023/0060903 A1 | 3/2023 | Kishi et al. |

FOREIGN PATENT DOCUMENTS

| | | |
|---|---|---|
| EP | 1640673 B1 | 8/2008 |
| EP | 3232283 B1 | 10/2019 |
| EP | 3620378 B1 | 11/2021 |
| EP | 3323727 B1 | 3/2022 |
| WO | 2006110165 | 12/2006 |
| WO | 2022185110 A1 | 9/2022 |

OTHER PUBLICATIONS

Somvarsky, et al., "Economic Load Allocation," 15th Triennial World Congress, Barcelona, Spain, Elseiver IFAC Publications, pp. 293-298. 2002.

* cited by examiner

COMPRESSOR CONTROL IN A VAPOR COMPRESSION COOLING CYCLE

BACKGROUND

Vapor compression cooling cycles include several stages: compression, condensation, expansion and evaporation. Two variables/inputs include the position of the expansion valve, and the speed of the compressor. Prior systems control compressor speed, typically, by measuring pressure between the evaporator and the compressor. However, compressor speed control can have poor sensitivity on the evaporator outlet pressure because, for example, the expansion valve controller may be independently controlled, and because variations in the evaporator wall temperature can affect the cycle and impair the control capability. New and improved methods for controlling such systems are desired.

OVERVIEW

The present inventors have recognized, among other things, that a problem to be solved is the need for new and/or alternative control methods and controllers for vapor compression cycle systems.

A first illustrative and non-limiting example takes the form of a motor controller for a compressor in a vapor cycle system having a compressor, a condenser, an expansion valve having an expansion valve position sensor, and an evaporator and including a plurality of temperature and pressure sensors, the motor controller configured to perform a method comprising: receiving a measured expansion valve position signal; comparing the expansion valve signal to a target expansion valve position signal to determine a expansion valve position delta; analyzing the expansion valve position delta to determine a first target speed for the compressor; analyzing at least a mass flow signal and one or more surge limitations on the compressor, and calculating an adjusted the first target speed for the compressor to prevent compressor surge; and issuing control signals to the compressor to operate at adjusted first target speed.

Another example takes the form of a vapor cycle system comprising the motor controller of the first illustrative and non-limiting example, a compressor having a motor, wherein the compressor is a centrifugal compressor.

Another example takes the form of a vapor cycle system comprising the motor controller of the first illustrative and non-limiting example, a compressor having a motor, a compressor inlet and a compressor outlet, the motor controller coupled to the compressor motor, a condenser having an inlet and an outlet; an expansion valve having an actuator, an inlet and an outlet; an expansion valve position sensor; an expansion valve controller configured to control the actuator; an evaporator having an inlet and an outlet; connections between the compressor outlet and condenser inlet, the condenser outlet and the expansion valve inlet, the expansion valve outlet and the evaporator input, and the evaporator outlet and the compressor input; and a mass flow sensor configured to sense mass flow from the evaporator outlet to the compressor input and issue the mass flow signal to the motor controller.

Another example takes the form of a vapor cycle system comprising the motor controller of the first illustrative and non-limiting example, a compressor having a motor, a compressor inlet and a compressor outlet, the motor controller coupled to the compressor motor, a condenser having an inlet and an outlet; an expansion valve having an actuator, an inlet and an outlet; an expansion valve position sensor; an expansion valve controller configured to control the actuator; an evaporator having an inlet and an outlet; connections between the compressor outlet and condenser inlet, the condenser outlet and the expansion valve inlet, the expansion valve outlet and the evaporator input, and the evaporator outlet and the compressor input; an evaporator outlet temperature sensor and an evaporator outlet pressure sensor; a compressor outlet temperature sensor and a compressor outlet pressure sensor; and an observer, the observer configured to use signals from the evaporator outlet temperature sensor, the evaporator outlet pressure sensor, the compressor outlet temperature sensor, and the compressor outlet pressure sensor, a model of the compressor, and a compressor speed to estimate the mass flow, the observer further configured to provide the mass flow signal to the motor controller.

Additionally or alternatively, the observer uses a Kalman filter.

Additionally or alternatively, the connections take the form of pipes.

Additionally or alternatively, the vapor cycle system also includes a first pressure sensor configured to sense pressure at or upstream of the compressor inlet and a second pressure sensor configured to sense pressure at or downstream of the compressor outlet, wherein the motor controller is configured to use each of a first signal from the first pressure sensor, a second signal from the second pressure sensor, the mass flow signal, and an actual compressor speed to calculate the adjusted first target speed.

Additionally or alternatively, the expansion valve controller is configured to control the expansion valve actuator by: receiving each of a first measured pressure downstream of the evaporator outlet and a measured temperature downstream of the evaporator outlet; using the first measured pressure to determine a temperature setpoint; analyzing a difference between the temperature setpoint and the first measured temperature to determine a target valve position; and issuing a control signal to the expansion valve actuator based on the target valve position.

Another illustrative and non-limiting example takes the form of a motor controller for a compressor in a vapor cycle system having a compressor, a condenser, an expansion valve, and an evaporator and including a plurality of temperature and pressure sensors, the motor controller configured to perform a method comprising: receiving a mass flow signal indicating mass flow of circulating refrigerant from the evaporator to the compressor; comparing the mass flow signal to a target mass flow to determine a mass flow delta; analyzing the mass flow delta to determine a first target speed for the compressor; analyzing the mass flow signal and one or more surge limitations on the compressor, and calculating an adjusted first target speed for the compressor to prevent compressor surge; and issuing control signals to the compressor to operate at the adjusted first target speed.

Another illustrative and non-limiting example takes the form of a vapor cycle system comprising the motor controller the preceding example, and a compressor having a motor, wherein the compressor is a centrifugal compressor.

Additionally or alternatively, the vapor cycle system may include a condenser having an inlet and an outlet; an expansion valve having an actuator, an inlet and an outlet; an expansion valve position sensor; an expansion valve controller configured to control the actuator; an evaporator having an inlet and an outlet; connections between the compressor outlet and condenser inlet, the condenser outlet and the expansion valve inlet, the expansion valve outlet and the evaporator input, and the evaporator outlet and the compressor input; and a mass flow sensor configured to sense mass flow from the evaporator outlet to the compressor input and provide the mass flow signal to the motor controller.

Additionally or alternatively, the vapor cycle system may also include at least a first pressure sensor configured to sense pressure at or upstream of the compressor inlet and a second pressure sensor configured to sense pressure at or downstream of the compressor outlet, wherein the motor controller is configured to use each of a first signal from the first pressure sensor, a second signal from the second pressure sensor, the mass flow signal, and an actual compressor speed to calculate the adjusted first target speed.

Additionally or alternatively the expansion valve controller is configured to control the expansion valve actuator by: receiving each of a first measured pressure downstream of the evaporator outlet and a measured temperature downstream of the evaporator outlet; using the first measured pressure to determine a temperature setpoint; analyzing a difference between the temperature setpoint and the first measured temperature to determine a target valve position; and issuing a control signal to the expansion valve actuator based on the target valve position.

Additionally or alternatively, the vapor cycle system may include a condenser having an inlet and an outlet; an expansion valve having an actuator, an inlet and an outlet; an expansion valve position sensor; an expansion valve controller configured to control the actuator; an evaporator having an inlet and an outlet; connections between the compressor outlet and condenser inlet, the condenser outlet and the expansion valve inlet, the expansion valve outlet and the evaporator input, and the evaporator outlet and the compressor input; an evaporator outlet temperature sensor and an evaporator outlet pressure sensor; a compressor outlet temperature sensor and a compressor outlet pressure sensor; and an observer, the observer configured to use signals from the evaporator outlet temperature sensor, the evaporator outlet pressure sensor, the compressor outlet temperature sensor, and the compressor outlet pressure sensor, a model of the compressor, and a compressor speed to estimate the mass flow, the observer further configured to provide the mass flow signal to the motor controller.

Additionally or alternatively the observer uses a Kalman filter.

Additionally or alternatively the connections take the form of pipes.

Additionally or alternatively the vapor cycle system further includes least a first pressure sensor configured to sense pressure at or upstream of the compressor inlet and a second pressure sensor configured to sense pressure at or downstream of the compressor outlet, wherein the motor controller is configured to use each of a first signal from the first pressure sensor, a second signal from the second pressure sensor, the mass flow signal, and an actual compressor speed to calculate the adjusted first target speed.

Additionally or alternatively the expansion valve controller is configured to control the expansion valve actuator by: receiving each of a first measured pressure downstream of the evaporator outlet and a measured temperature downstream of the evaporator outlet; using the first measured pressure to determine a temperature setpoint; analyzing a difference between the temperature setpoint and the first measured temperature to determine a target valve position; and issuing a control signal to the expansion valve actuator based on the target valve position.

Another illustrative and non-limiting example takes the form of a method of controlling a compressor motor in a vapor cycle system having a compressor, a condenser, an expansion valve having an expansion valve position sensor, and an evaporator and including a plurality of temperature and pressure sensors, the method comprising: receiving an expansion valve position signal from the expansion valve position sensor; comparing the expansion valve position signal to a target value to determine an expansion valve position delta; analyzing the expansion valve position delta to determine a first target speed for the compressor; analyzing at least a mass flow signal and one or more surge limitations on the compressor, and calculating an adjusted first target speed for the compressor to prevent compressor surge; and issuing control signals to the compressor to operate at the adjusted first target speed.

Additionally or alternatively, the method includes obtaining the mass flow signal using an observer configured to use signals from the evaporator outlet temperature sensor, the evaporator outlet pressure sensor, the compressor outlet temperature sensor, and the compressor outlet pressure sensor, a model of the compressor, and a compressor speed to estimate mass flow, and using the estimated mass flows as the mass flow signal.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
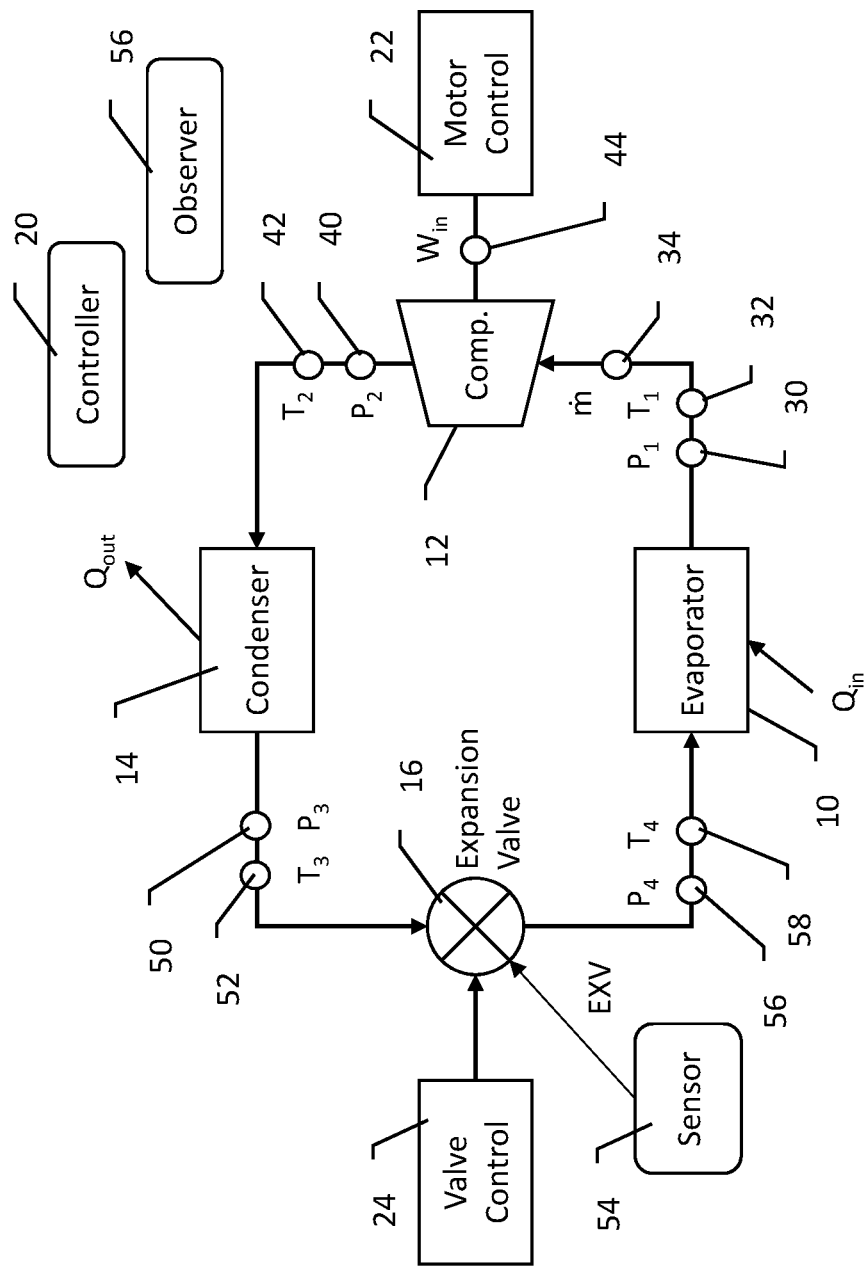
FIG. 1 shows an illustrative vapor compression cooling system.

FIG. 1 shows an illustrative vapor compression cooling system. An evaporator 10 has an outlet coupled via connectors, such as pipes, to a compressor 12. The compressor 12 has an inlet to receive a circulating refrigerant from the connectors linked to the evaporator 10. The compressor 12 includes a motor that is controlled by a motor controller, which operates the compressor at a speed that can be monitored by a speed sensor, generating a compressor speed, $W_{in}$. The compressor 12 has an outlet that delivers the circulating refrigerant to the inlet of a condenser 14 via further connectors, which may be piping. The condenser 14 has an outlet that is coupled to the inlet of an expansion valve 16, with further connectors which again may be pipes. The expansion valve 16 has a valve position that is controlled by an expansion valve actuator which receives control signals from a valve controller 24. Some examples may include an expansion valve position sensor 54 to sense the position of the expansion valve 16, yielding an expansion valve position signal, EXV. The circulating refrigerant is delivered from an outlet of the expansion valve 16 to the inlet of the evaporator 10.

In operation, at the evaporator 10, the circulating refrigerant absorbs heat, Qin, typically from circulating air as may be circulated in an air conditioner, such as in a vehicle cabin, or in a cooling system such as a cooling system for an electric vehicle battery or battery pack. As the circulating refrigerant absorbs heat from the circulating air, it begins to boil and changes phase again. The circulating refrigerant exits the evaporator as a low-pressure and low temperature vapor. The circulating refrigerant is then returned to the compressor inlet. Pressure sensor 30 senses pressure $P_1$, and temperature sensor 32 senses temperature $T_1$ at or downstream of the evaporator outlet, or at or upstream of the compressor inlet, and may be positioned as desired. In some examples, a mass flow sensor 34 may also be positioned at this location, as the relatively lower pressure and temperature, as well as the phase (gaseous) at this location is amenable to operation of a mass flow sensor. Mass flow herein is represented by the symbol for change in mass, m.

The compressor 12 compresses the circulating refrigerant to a high-pressure vapor state, in which the circulating refrigerant is superheated. The compressor 12 can be any suitable form, including centrifugal, scroll, screw, and/or reciprocating compressors. The circulating refrigerant, in high-pressure vapor state, passes from the outlet of compressor 12 to the inlet of the condenser 14. Pressure sensor 40 senses pressure $P_2$, and temperature sensor 42 senses temperature $T_2$, as the hot vapor flows to the condenser 14, where the refrigerant is cooled by heat exchange. Heat, $Q_{out}$, escapes. For example, forced air may pass over/through the condenser to extract heat. The circulating refrigerant undergoes phase change (condenses) to a high-pressure liquid once a saturation temperature for the circulating refrigerant is reached in the condenser 14.

The circulating refrigerant passes as high-pressure liquid from the outlet of the condenser 14 to the inlet of expansion valve 16. Pressure sensor 50 senses pressure $P_3$, and temperature sensor 52 senses temperature $T_3$, as the high-pressure liquid flows to the expansion valve 16. At the expansion valve 24, the circulating refrigerant is allowed to expand to reduce pressure. This also causes the temperature of the circulating refrigerant to drop. The low pressure, low temperature liquid circulating refrigerant is passed from the outlet of the expansion valve 16 to the inlet of evaporator 10. Pressure sensor 56 senses pressure $P_4$, and temperature sensor 58 senses temperature $T_4$, as the low pressure, low temperature liquid circulating refrigerant passes to the evaporator 10.

Pressure and temperature sensors are shown for illustrative purposes in each segment of the connectors or pipes. However, some of these may be omitted in some installations; it may be that all the sensors would be present for purposes of modeling system operation prior to use, such as in any of installation, product, or operation qualification process or for pre-production testing, while commercial or operational installations omit one or more sensors if desired.

The mass flow sensor 34 may be omitted in some examples. An observer 56, which may use a Kalman filter, can be used to estimate mass flow if needed. An overall controller 20 may determine general operating conditions, demands, and or on/off state of the components and system. The observer, for example, may estimate mass flow by the use of a flow or compressor model developed in testing, using as inputs compressor speed, pressures P1, and P2, temperatures T1, T2, and knowledge of circulating refrigerant characteristics. In another example, a mass flow estimator may be based on the expansion valve model and uses expansion valve inlet pressure and temperature P3, T3 and expansion valve outlet pressure and temperature, P4, T4. In yet another example, models of more components from the system, such as the condenser and evaporator, may be involved to enhance accuracy of the refrigerant mass flow estimator. The particular configuration of the mass flow estimator depends on the overall cooling system layout and on installed pressure, temperature and other sensors. Both an observer and a mass flow sensor 34 may be present in some examples, where the inclusion of each can be useful to detect faults such as, for example and without limitation, blockage of the circulating refrigerant and/or wear or fault in the compressor 12 or expansion valve 16.

In some uses, a vapor cycle cooling system may omit a valve control 24, and instead has a fixed expansion valve 16. Doing so allows the pressure, P1, and mass flow, m, which may be estimated or measured, to reliably allow control in general. This can simplify operation of the cooling system, but is not as flexible as may be needed in some installations. When two controllers are present, it becomes possible for the control actions of one to affect or impair optimization of the other, and so new and alternative solutions that can address the potential for the expansion valve 16 to be adjusted are needed.

Figure 2:
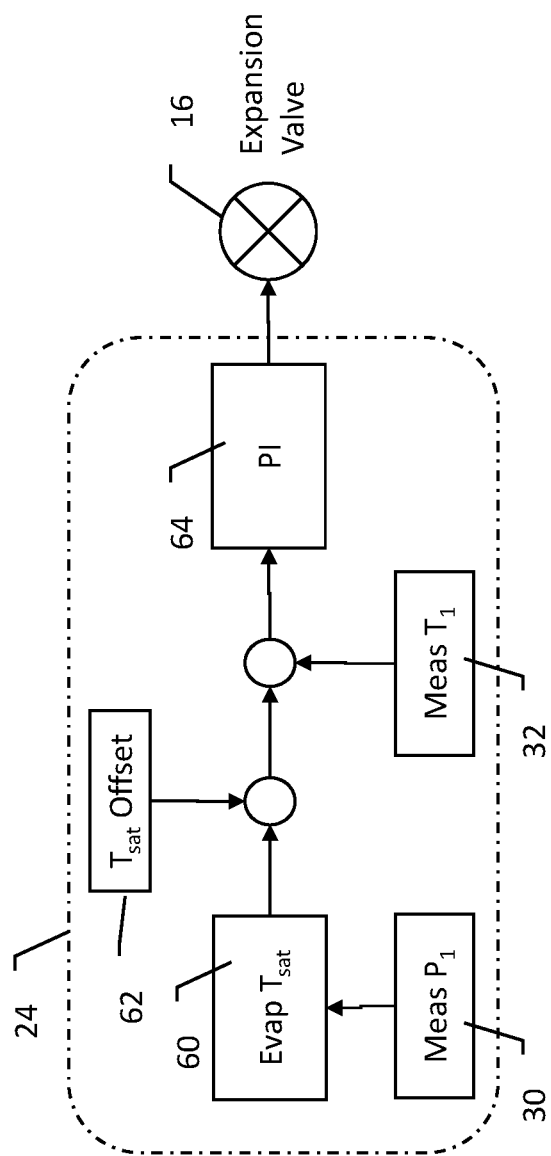
FIGS. 2-3 show illustrative expansion valve controllers.
Figure 3:
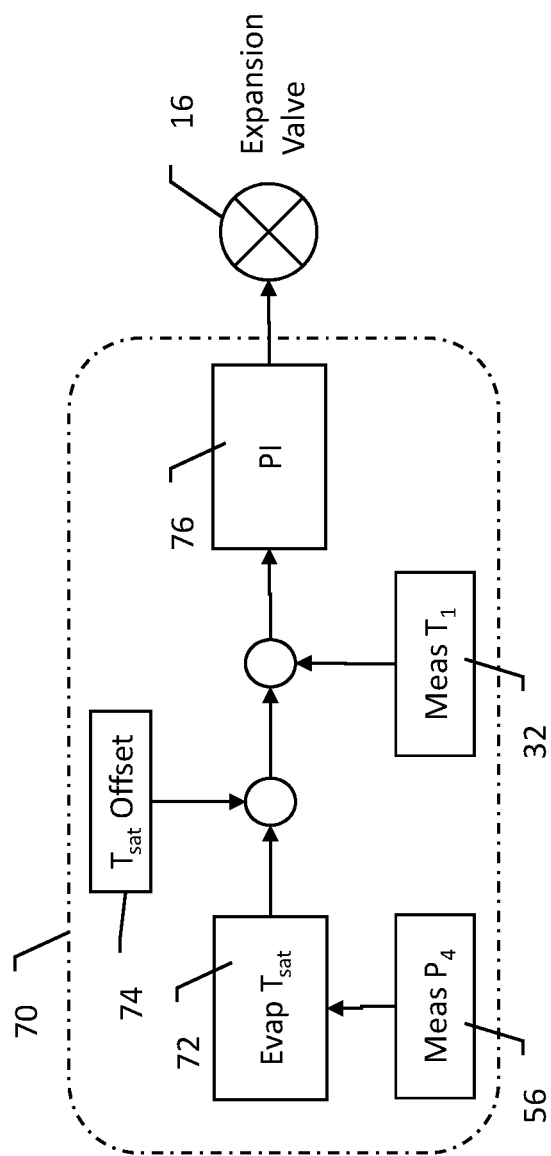

FIGS. 2-3 show illustrative expansion valve controllers. In FIG. 2, the expansion valve 16 is controlled by a first implementation shown at 24. Here, measured $P_1$ 30 (sensed between the evaporator and the compressor), is used to determine the saturation temperature of the circulating refrigerant at that location at 60. An offset is added, as indicated at 62, and the result is compared to the measured temperature $T_1$ 32 (again, sensed between the evaporator and the compressor). A proportional/integral control is used at 64, where proportional control addresses mismatch from the target temperature in the near term, and integral control prevents long term error or offset, with tuning that can be adjusted as desired for the particular implementation. The output is issued to control the actuator of the expansion valve 16, which will open to increase mass flow and drive down the temperature measured at $T_1$, or close to decrease mass flow and raise the temperature measured at $T_1$.

An alternative expansion valve controller 70 is shown in FIG. 3. Here, the pressure upstream of the evaporator, $P_4$ 56, and downstream of the expansion valve, is used as a control input to determine the evaporation temperature of the circulating refrigerant at 72. An offset is again applied as indicated at 74, and the result is compared to the measured $T_1$ 32 (again, between the evaporator and compressor). The result is again provide to a proportional integral control 76, with tuning that may be adjusted as desired to determine the speed of response to immediate offset as well as long term error. The output is issued to control the actuator of the expansion valve 16, which will open to increase mass flow and drive down the temperature measured at $T_1$, or close to decrease mass flow and raise the temperature measured at $T_1$.

Figure 4:
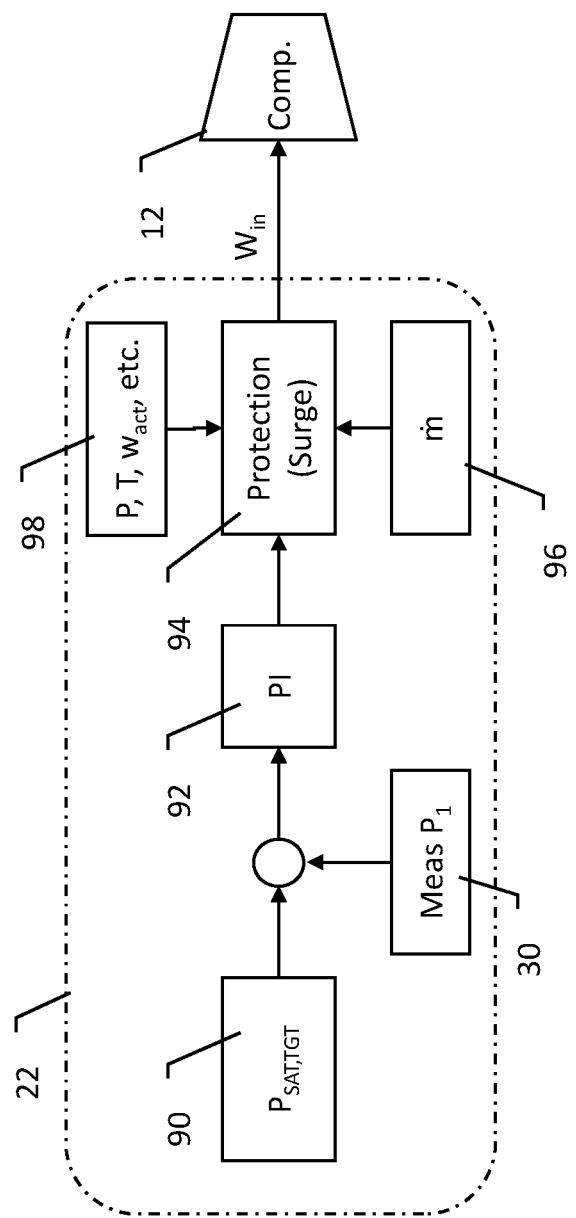
FIGS. 4-9 show illustrative compressor motor controllers.

FIGS. 4-9 show illustrative compressor motor controllers. In FIG. 4, the controller 22 receives measured $P_1$ 30, and compares to a target pressure 90. The difference is delivered to a proportional integral controller 92. The proportional integral controller 92 uses the input and its tuning to determine a first target speed for the compressor.

The centrifugal compressor has physical limits which must be respected, including limitations that vary with other conditions, such as compressor surge. Compressor surge is a condition that can cause noisy operation and vibration, and when severe or prolonged can cause damage to compressor componentry. Compressor maps provide indications of surge boundaries, indicating the minimum mass flow needed at a given compressor pressure ratio; if mass flow is too low to sustain the compressor pressure ratio, surge will result. Surge can be avoided in several ways but the most simple or direct, from the perspective of compressor motor control, may be to adjust compressor speed. The controller 22 includes a protection block 94 intended to address surge (other factors, such as low cycle fatigue may also be addressed, if desired, to limit or penalize changes in compressor speed). The protection block 94 can receive various inputs 98 such as pressure, temperatures, measured compressor speed ($W_{act}$), and also receives a mass flow signal as indicated at 96. The mass flow signal 96 may be a measured mass flow or an estimated mass flow that is based on a model. The protection block 94 can determine a second target speed including adjustment, if needed, to the first target speed. The second target speed is then used to control compressor operation, resulting in the input compressor speed, $W_{in}$, which is issued to the compressor motor 12 as a control signal.

The controller as shown in FIG. 4 may suffer from using the same input parameter, $P_1$, as that used by another controller in the system, that is, the expansion valve controller shown in FIG. 2, above. With both controllers relying on the same signal and affecting the same system, interference between the two can arise, resulting in an imperfect solution. Further, it should be noted that the ability of the compressor 12 to affect a pressure immediately upstream of its inlet is limited by the fact that there are three other elements of the system (condenser, expansion valve, evaporator) and the connections throughout that separate the compressor outlet from the sensor for $P_1$, where the feedback is sensed. The approach in FIG. 4 is an indirect control solution.

Figure 5:
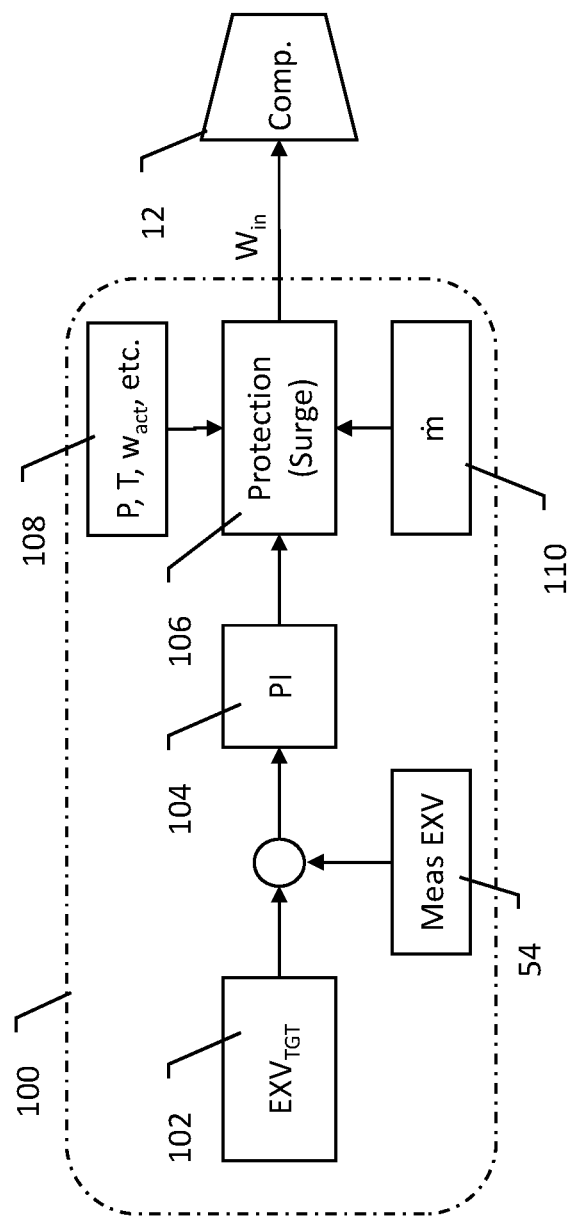

FIG. 5 provides another solution that may reduce complications associated with the approach in FIG. 4. In FIG. 5, the controller 100 receives the measured expansion valve position 54, and compares it to a target expansion valve position 102. The target expansion valve position 102 may be pre-set or may vary, for example, with input conditions (ambient temperature or humidity, or cooling demand, for example and without limitation). The difference between the measured expansion valve position 54 and target expansion valve position 102 is determined and provided to a proportional-integral (PI) controller 104 having tuning settings that can be preset or determined as desired. The PI controller tuning is used to ensure non-oscillatory behavior of the feedback loop, with sufficient bandwidth to ensure fast reaction to system disturbances, for example to sudden cooling demand changes. A suitable anti-windup strategy may also be implemented to ensure saturation of the integral math when select limits in the feedback loop are achieved (e.g. to operate outside surge conditions).

The PI controller 104 generates a first speed request or command, that is then operated on by the (surge) protection block 106 which again receives various inputs indicated at 108 (pressure, temperature, actual compressor speed, etc. as desired), as well as the estimated or measured mass flow 110. Output speed command is then issued to the compressor 12. Because the actions of controller 100 are, in the example of FIG. 5, reliant on the actual output of the expansion valve controller, rather than reusing the same inputs as the other controller, potential competition between control actions is mitigated. The output speed command may be referred to as an adjusted first target speed; in some circumstances no adjustment would be made (if no surge conditions are present or likely) and so the adjusted first target speed will be the same as the first target speed.

FIG. 5, and the below FIGS. 6-9, use a PI controller to set the speed request. If desired, other control configurations can be used. For example, model predictive control (MPC) could be used, if desired. For an MPC, a cost function minimization is typically performed over a prediction horizon. The prediction horizon may contemplate multiple actions and the external environment. For example, the MPC may include in its prediction horizon the actions of the expansion valve controller. External disturbances may be treated as fixed for purposes of the MPC design, or the MPC may instead include some prediction of external disturbances, as desired. Fully designing such an MPC, such as by incorporating likely cooling demands due to ambient conditions (as for an air conditioner), or for use conditions, as could be the case for a battery pack in a vehicle by considering, for example, road grade (which would determine discharge and charging states), or upcoming fast-charging event (for an electric vehicle battery) may also be contemplated.

Figure 6:
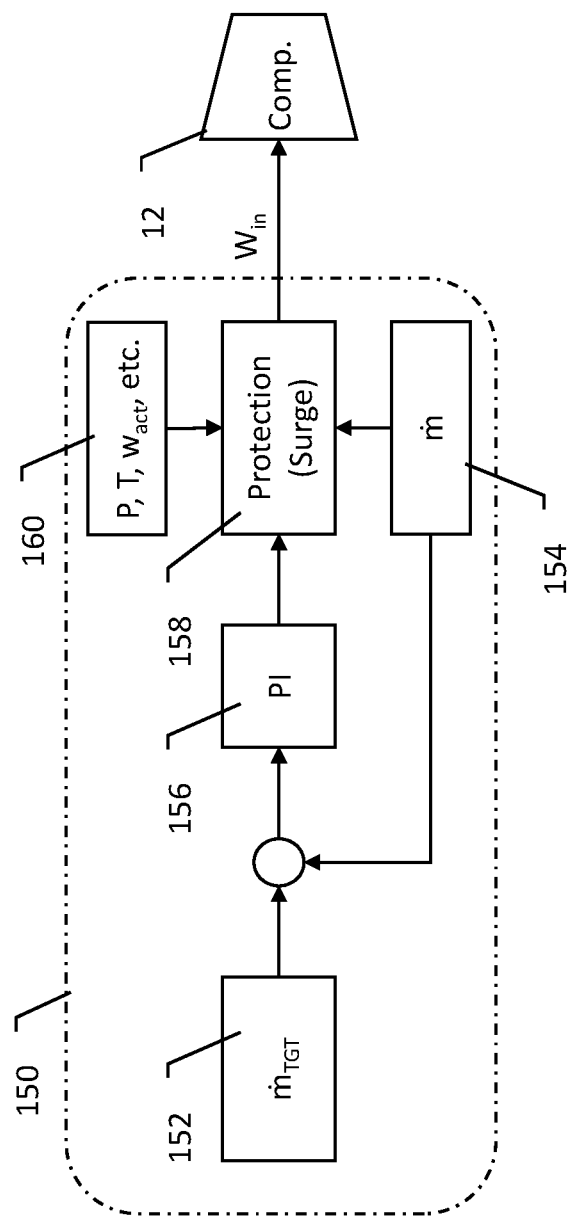

FIG. 6 shows another example. Here, a compressor controller 150 has a stated target mass flow, indicated at 152. A measured or estimated mass flow 154 is compared to the target, and the difference provided to a PI controller 156 having desired tuning. This sets a first speed request or command, that is then operated on by the (surge) protection block 158 using various inputs indicated at 160 (pressure, temperature, actual compressor speed, etc. as desired), as well as the estimated or measured mass flow 154. The output speed command is then issued to the compressor 12. In this instance, mass flow measurement, rather than estimate, may be preferred. The output speed command may again be referred to as an adjusted first target speed; in some circumstances no adjustment would be made (if no surge conditions are present or likely) and so the adjusted first target speed will be the same as the first target speed.

Figure 7:
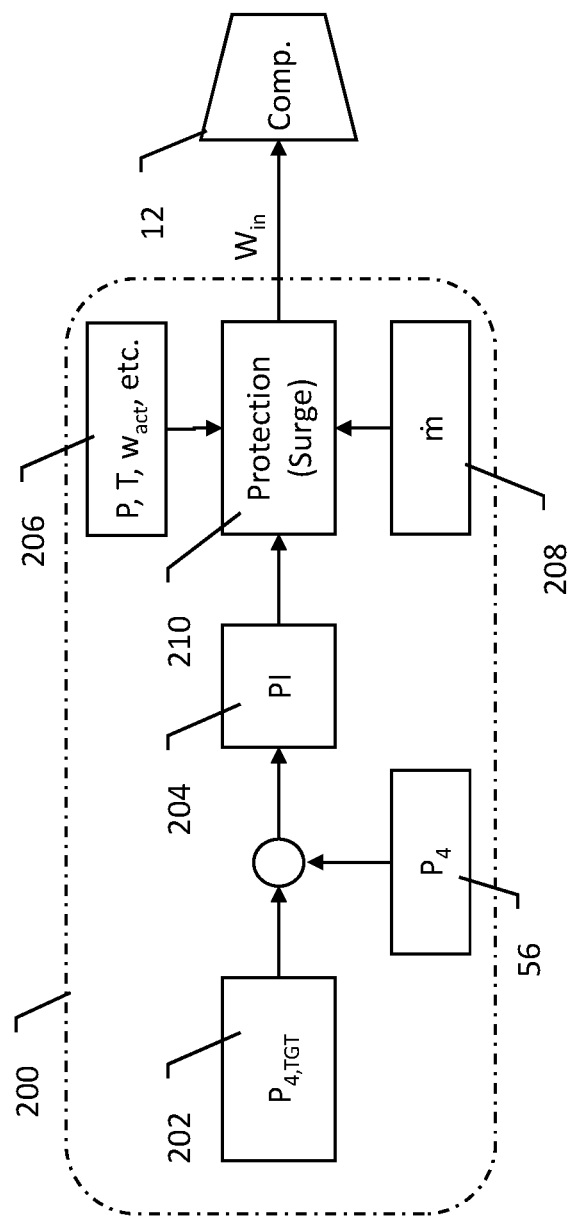

FIG. 7 shows another example. Here, the compressor controller 200 uses the measured evaporator inlet pressure, $P_4$ 56, and compares to a target 202. The pressure difference is fed to a PI controller 204 having desired tuning. This sets a first speed request or command, that is then operated on by the (surge) protection block 210 using various inputs indicated at 206 (pressure, temperature, actual compressor speed, etc. as desired), as well as the estimated or measured mass flow 208. The output speed command is then issued to the compressor 12. The output speed command may be referred to as an adjusted first target speed; in some circumstances no adjustment would be made (if no surge conditions are present or likely) and so the adjusted first target speed will be the same as the first target speed.

Figure 8:
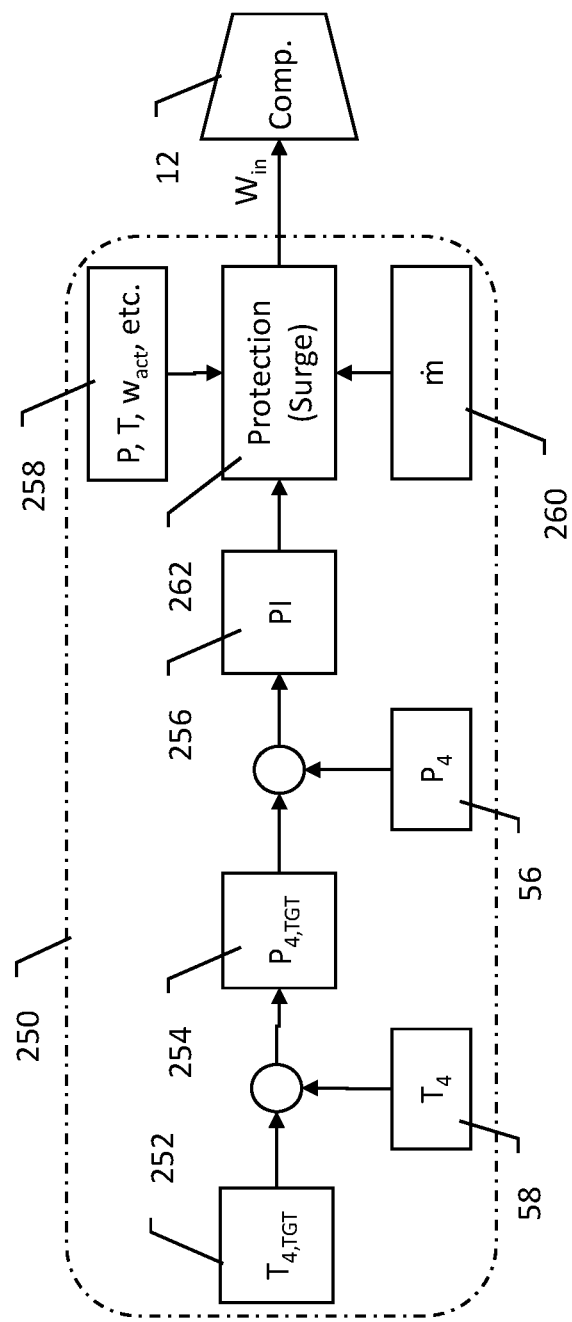

FIG. 8 shows still another example, which is in some ways an expansion on that of FIG. 7. The compressor controller 250 receives the evaporator inlet temperature, $T_4$ 58, and compares to a target 252. This yields a pressure target for the compressor inlet, as indicated at 254. For example, the pressure target block 254 may involve a PI feedback controller. The PI controller outputs such $P_{4,tgt}$, which ensures that the evaporator inlet temperature $T_4$ 58 is equal or is close to its target $T_{4,tgt}$, 252. The target 254 is then compared to the evaporator inlet pressure, $P_4$ 56. A PI controller 256 having desired tuning sets a first speed request or command, that is then operated on by the (surge) protection block 262 using various inputs indicated at 258 (pressure, temperature, actual compressor speed, etc. as desired), as well as the estimated or measured mass flow 260. The output speed command is then issued to the compressor 12. The output speed command may be referred to as an adjusted first target speed; in some circumstances no adjustment would be made (if no surge conditions are present or likely) and so the adjusted first target speed will be the same as the first target speed.

Figure 9:
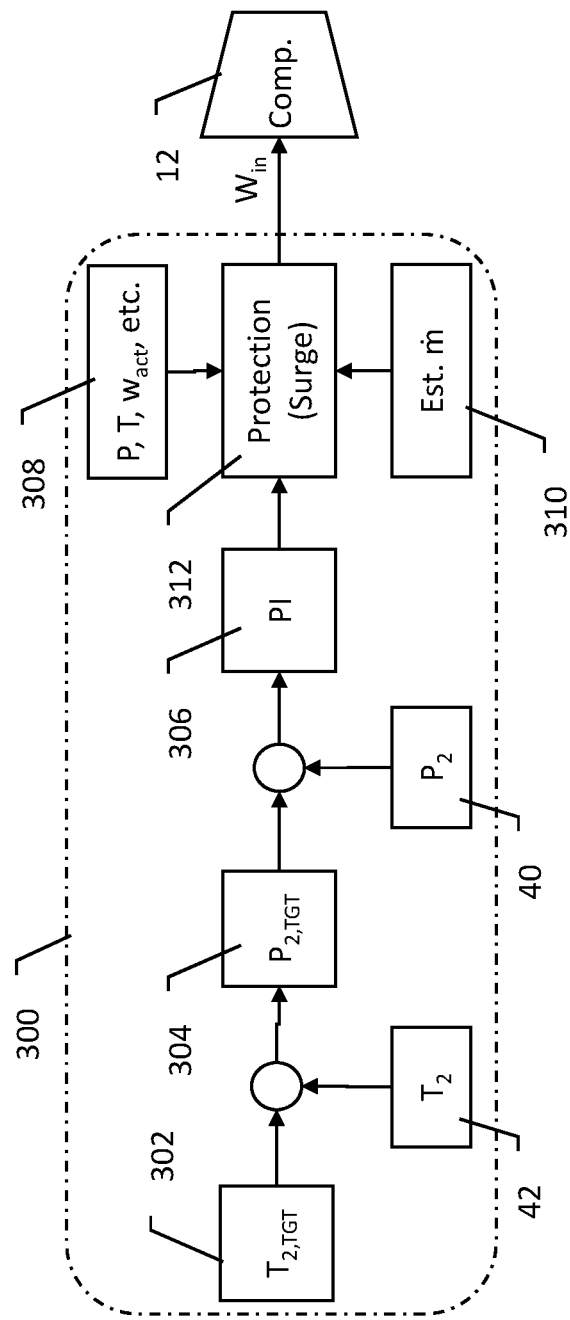

FIG. 9 shows another example. The controller 300 receives a compressor outlet temperature, $T_2$ 42, and compares to a target 302. The comparison is used to determine a pressure target for the compressor outlet, as indicated at 304. For example, the pressure target block 304 may involve a PI feedback controller. The PI controller outputs such $P_{2,tgt}$, which ensures that the compressor outlet temperature $T_2$ 42, is equal or is close to its target $T_{2,tgt}$, 302. The measured compressor outlet pressure, $P_2$ 40, is compared to the target 304, and the difference fed to a PI controller 306. The PI controller 306 having desired tuning sets a first speed request or command, that is then operated on by the (surge) protection block 312 using various inputs indicated at 308 (pressure, temperature, actual compressor speed, etc. as desired), as well as the estimated or measured mass flow 310. The output speed command is then issued to the compressor 12. The output speed command may be referred to as an adjusted first target speed; in some circumstances no adjustment would be made (if no surge conditions are present or likely) and so the adjusted first target speed will be the same as the first target speed.

It may be still further possible, in an analogous manner, to use one or both of $P_3$ 50 and $T_3$ 52 sensors in similar fashion to that shown in FIGS. 7-9, if desired.

In several examples above, an overall understanding of the method may be that a first indicator of mass flow is received. The first indicator may be any of an expansion valve position control signal, an expansion valve position sensor signal, either of which indicate how much mass is flowing at the expansion valve and therefore how much is flowing in the system. The first indicator may instead be a measured mass flow, or an observer-derived mass flow estimate, if desired. A mass flow target delta is then calculated, based, for example, on a target that is linked to the first indicator; for example, if the first indicator is an expansion valve position control signal, then the target may be a target control signal, or a target position, or a target mass flow based on a model of the expansion valve itself. The delta can instead be derived using a target mass flow, for example, based on cooling demand if desired, which would be compared to the measured mass flow or the observer-derived mass flow estimate. This delta can be used to determine a first target speed for the compressor motor. The first target speed is thus based on the cooling demand target, but is handled in a way that avoids the potential competition between the expansion valve controller and the compressor motor controller. Next, the operating conditions of the compressor are analyzed for compressor health reasons, including to analyze compressor surge. Optionally, the compressor speed may also be analyzed, and the first target speed is then adjusted to minimize health impacts on the compressor, with particular focus in some examples on compressor surge, though other factors may also be considered such as fatigue due to speed changes. The adjusted first target speed is then used to determine control signals provided to the compressor motor.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A motor controller for a compressor in a vapor cycle system having a compressor, a condenser, an expansion valve having an expansion valve position sensor, and an evaporator and including a plurality of temperature and pressure sensors, the motor controller configured to perform a method comprising:
   receiving a measured expansion valve position signal;
   comparing the expansion valve signal to a target expansion valve position signal to determine a expansion valve position delta;
   analyzing the expansion valve position delta to determine a first target speed for the compressor;
   analyzing at least a mass flow signal and one or more surge limitations on the compressor, and calculating an adjusted the first target speed for the compressor to prevent compressor surge; and
   issuing control signals to the compressor to operate at the adjusted first target speed.

2. A vapor cycle system comprising the motor controller of claim 1 and a compressor having a motor, wherein the compressor is a centrifugal compressor.

3. A vapor cycle system comprising:
   a compressor having a motor, a compressor inlet and a compressor outlet;
   the motor controller of claim 1 coupled to the motor;
   a condenser having an inlet and an outlet;
   an expansion valve having an actuator, an inlet and an outlet;
   an expansion valve position sensor;
   an expansion valve controller configured to control the actuator;
   an evaporator having an inlet and an outlet;
   connections between the compressor outlet and condenser inlet, the condenser outlet and the expansion valve inlet, the expansion valve outlet and the evaporator inlet, and the evaporator outlet and the compressor inlet; and
   a mass flow sensor configured to sense mass flow from the evaporator outlet to the compressor inlet and issue the mass flow signal to the motor controller.

4. A vapor cycle system comprising:
   a compressor having a motor, a compressor inlet and a compressor outlet;
   the motor controller of claim 1 coupled to the motor;
   a condenser having an inlet and an outlet;
   an expansion valve having an actuator, an inlet and an outlet;
   an expansion valve position sensor;
   an expansion valve controller configured to control the actuator;
   an evaporator having an inlet and an outlet;
   connections between the compressor outlet and condenser inlet, the condenser outlet and the expansion valve inlet, the expansion valve outlet and the evaporator inlet, and the evaporator outlet and the compressor inlet;
   an evaporator outlet temperature sensor and an evaporator outlet pressure sensor;
   a compressor outlet temperature sensor and a compressor outlet pressure sensor; and
   an observer, the observer configured to use signals from the evaporator outlet temperature sensor, the evaporator outlet pressure sensor, the compressor outlet temperature sensor, and the compressor outlet pressure sensor, a model of the compressor, and a compressor speed to estimate the mass flow, the observer further configured to provide the mass flow signal to the motor controller.

5. The vapor cycle system of claim 4, wherein the observer uses a Kalman filter.

6. The vapor cycle system of claim 3, wherein the connections take the form of pipes.

7. The vapor cycle system of claim 3, further comprising at least a first pressure sensor configured to sense pressure at or upstream of the compressor inlet and a second pressure sensor configured to sense pressure at or downstream of the compressor outlet, wherein the motor controller is configured to use each of a first signal from the first pressure sensor, a second signal from the second pressure sensor, the mass flow signal, and an actual compressor speed to calculate the adjusted first target speed.

8. The vapor cycle system of claim 3, wherein the expansion valve controller is configured to control the expansion valve actuator by:
   receiving each of a first measured pressure downstream of the evaporator outlet and a measured temperature downstream of the evaporator outlet;
   using the first measured pressure to determine a temperature setpoint;
   analyzing a difference between the temperature setpoint and the first measured temperature to determine a target valve position; and
   issuing a control signal to the expansion valve actuator based on the target valve position.

9. A motor controller for a compressor in a vapor cycle system having a compressor, a condenser, an expansion valve, and an evaporator and including a plurality of temperature and pressure sensors, the motor controller configured to perform a method comprising:
   receiving a mass flow signal indicating mass flow of circulating refrigerant from the evaporator to the compressor;
   comparing the mass flow signal to a target mass flow to determine a mass flow delta;
   analyzing the mass flow delta to determine a first target speed for the compressor;
   analyzing the mass flow signal and one or more surge limitations on the compressor, and calculating an adjusted first target speed for the compressor to prevent compressor surge; and
   issuing control signals to the compressor to operate at the adjusted first target speed.

10. A vapor cycle system comprising the motor controller of claim 9 and a compressor having a motor, wherein the compressor is a centrifugal compressor.

11. A vapor cycle system comprising:
   a compressor having a motor, a compressor inlet and a compressor outlet;
   the motor controller of claim 9 coupled to the motor;
   a condenser having an inlet and an outlet;
   an expansion valve having an actuator, an inlet and an outlet;
   an expansion valve position sensor;
   an expansion valve controller configured to control the actuator;
   an evaporator having an inlet and an outlet;
   connections between the compressor outlet and condenser inlet, the condenser outlet and the expansion valve inlet, the expansion valve outlet and the evaporator inlet, and the evaporator outlet and the compressor inlet; and a mass flow sensor configured to sense mass flow from the evaporator outlet to the compressor inlet and provide the mass flow signal to the motor controller.

12. The vapor cycle system of claim 11, further comprising at least a first pressure sensor configured to sense pressure at or upstream of the compressor inlet and a second pressure sensor configured to sense pressure at or downstream of the compressor outlet, wherein the motor controller is configured to use each of a first signal from the first pressure sensor, a second signal from the second pressure sensor, the mass flow signal, and an actual compressor speed to calculate the adjusted first target speed.

13. The vapor cycle system of claim 11, wherein the expansion valve controller is configured to control the expansion valve actuator by:
   receiving each of a first measured pressure downstream of the evaporator outlet and a measured temperature downstream of the evaporator outlet;
   using the first measured pressure to determine a temperature setpoint;
   analyzing a difference between the temperature setpoint and the first measured temperature to determine a target valve position; and
   issuing a control signal to the expansion valve actuator based on the target valve position.

14. A vapor cycle system comprising:
   a compressor having a motor, a compressor inlet and a compressor outlet;
   the motor controller of claim 9 coupled to the motor;
   a condenser having an inlet and an outlet;
   an expansion valve having an actuator, an inlet and an outlet;
   an expansion valve position sensor;
   an expansion valve controller configured to control the actuator;
   an evaporator having an inlet and an outlet;
   connections between the compressor outlet and condenser inlet, the condenser outlet and the expansion valve inlet, the expansion valve outlet and the evaporator inlet, and the evaporator outlet and the compressor inlet;
   an evaporator outlet temperature sensor and an evaporator outlet pressure sensor;
   a compressor outlet temperature sensor and a compressor outlet pressure sensor; and
   an observer, the observer configured to use signals from the evaporator outlet temperature sensor, the evaporator outlet pressure sensor, the compressor outlet temperature sensor, and the compressor outlet pressure sensor, a model of the compressor, and a compressor speed to estimate the mass flow, the observer further configured to provide the mass flow signal to the motor controller.

15. The vapor cycle system of claim 14, wherein the observer uses a Kalman filter.

16. The vapor cycle system of claim 14, wherein the connections take the form of pipes.

17. The vapor cycle system of claim 14, further comprising at least a first pressure sensor configured to sense pressure at or upstream of the compressor inlet and a second pressure sensor configured to sense pressure at or downstream of the compressor outlet, wherein the motor controller is configured to use each of a first signal from the first pressure sensor, a second signal from the second pressure sensor, the mass flow signal, and an actual compressor speed to calculate the adjusted first target speed.

18. The vapor cycle system of claim 14, wherein the expansion valve controller is configured to control the expansion valve actuator by:
   receiving each of a first measured pressure downstream of the evaporator outlet and a measured temperature downstream of the evaporator outlet;
   using the first measured pressure to determine a temperature setpoint;
   analyzing a difference between the temperature setpoint and the first measured temperature to determine a target valve position; and
   issuing a control signal to the expansion valve actuator based on the target valve position.

19. A method of controlling a compressor motor in a vapor cycle system having a compressor, a condenser, an expansion valve having an expansion valve position sensor, and an evaporator and including a plurality of temperature and pressure sensors, the method comprising:
   receiving an expansion valve position signal from the expansion valve position sensor;
   comparing the expansion valve position signal to a target value to determine an expansion valve position delta;
   analyzing the expansion valve position delta to determine a first target speed for the compressor;
   analyzing at least a mass flow signal and one or more surge limitations on the compressor, and calculating an adjusted first target speed for the compressor to prevent compressor surge; and
   issuing control signals to the compressor to operate at the adjusted first target speed.

20. The method of claim 19, further comprising obtaining the mass flow signal using an observer configured to use signals from an evaporator outlet temperature sensor, an evaporator outlet pressure sensor, a compressor outlet temperature sensor, and a compressor outlet pressure sensor, a model of the compressor, and a compressor speed to estimate mass flow, and using the estimated mass flow as the mass flow signal.

* * * * *